United States Patent
Yin et al.

(10) Patent No.: US 10,033,547 B2
(45) Date of Patent: Jul. 24, 2018

(54) METHOD, DEVICE, AND SYSTEM FOR CONTROLLING TUNNEL IDENTIFIER ALLOCATION

(75) Inventors: Yu Yin, Shanghai (CN); Caixia Qi, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 396 days.

(21) Appl. No.: 13/314,682

(22) Filed: Dec. 8, 2011

(65) Prior Publication Data

US 2012/0076099 A1 Mar. 29, 2012

Related U.S. Application Data

(63) Continuation of application No. PCT/CN2010/073213, filed on May 25, 2010.

(30) Foreign Application Priority Data

Jun. 10, 2009 (CN) .......................... 2009 1 0147412

(51) Int. Cl.
*H04W 72/04* (2009.01)
*H04L 12/46* (2006.01)
(Continued)

(52) U.S. Cl.
CPC ..... *H04L 12/4633* (2013.01); *H04W 36/0033* (2013.01); *H04W 76/11* (2018.02); *H04W 76/22* (2018.02)

(58) Field of Classification Search
CPC ..... H04W 24/02; H04W 88/06; H04W 88/08; H04W 24/08; H04W 36/22; H04W 88/16; H04W 72/042
(Continued)

(56) References Cited

U.S. PATENT DOCUMENTS

2003/0024794 A1* 2/2003 Etherington et al. ......... 198/850
2003/0152042 A1* 8/2003 Soininen et al. ............. 370/310
(Continued)

FOREIGN PATENT DOCUMENTS

CN       1725751 A     1/2006
CN     101039506 A     9/2007
(Continued)

OTHER PUBLICATIONS

CN 101282511 machine translation as provided by State Intellectual Property Office of the People's Republic of China (http://english.sipo.gov.cn/).*
(Continued)

*Primary Examiner* — Asad Nawaz
*Assistant Examiner* — Najeebuddin Ansari
(74) *Attorney, Agent, or Firm* — Huawei Technologies Co., Ltd.

(57) ABSTRACT

A method, a device, and a system for controlling tunnel identifier allocation are provided. The method includes: determining whether a type of a current procedure allows a Serving Gateway (SGW) to change a Tunnel Endpoint Identifier (TEID) and/or an Internet Protocol (IP) address (S110); and sending an modify bearer request message to the SGW, in which the modify bearer request message is used for notifying the SGW of whether the SGW is allowed to change the TEID and/or the IP address (S120). The loss of service data packets of a user or the service interruption caused by that the SGW modifies the TEID and/or the IP address is avoided.

6 Claims, 7 Drawing Sheets

(51) Int. Cl.
*H04W 36/00* (2009.01)
*H04W 76/22* (2018.01)
*H04W 76/11* (2018.01)

(58) Field of Classification Search
USPC .................................................. 370/328–329
See application file for complete search history.

(56) References Cited

U.S. PATENT DOCUMENTS

| | | | |
|---|---|---|---|
| 2004/0057405 A1 | 3/2004 | Black | |
| 2005/0120350 A1 | 6/2005 | Ni et al. | |
| 2005/0169249 A1 | 8/2005 | Shirota et al. | |
| 2007/0127444 A1 | 6/2007 | Gras | |
| 2007/0248064 A1 | 10/2007 | Shaheen | |
| 2008/0031159 A1* | 2/2008 | Jokinen ............. | H04W 36/0033 370/255 |
| 2008/0254768 A1 | 10/2008 | Faccin | |
| 2008/0259873 A1* | 10/2008 | Ahmavaara ....... | H04W 36/0033 370/331 |
| 2009/0109925 A1 | 4/2009 | Nakamura et al. | |
| 2009/0238159 A1 | 9/2009 | Takano et al. | |
| 2009/0305707 A1* | 12/2009 | Pudney ................ | H04W 40/34 455/445 |
| 2010/0017601 A1 | 1/2010 | Falk et al. | |
| 2010/0027448 A1 | 2/2010 | Puthiyandyil et al. | |
| 2010/0260141 A1 | 10/2010 | Chowdhury et al. | |
| 2010/0309881 A1* | 12/2010 | Kim et al. ..................... | 370/331 |
| 2011/0019624 A1* | 1/2011 | Lu et al. ........................ | 370/328 |
| 2011/0110350 A1* | 5/2011 | Lu et al. ........................ | 370/338 |
| 2011/0141884 A1* | 6/2011 | Olsson et al. ................. | 370/225 |

FOREIGN PATENT DOCUMENTS

| | | | |
|---|---|---|---|
| CN | 101282511 A | * | 10/2008 |
| CN | 101350952 A | | 1/2009 |
| CN | 101394580 A | | 3/2009 |
| CN | 101448251 A | | 6/2009 |
| CN | 101459907 A | | 6/2009 |
| CN | 101729337 A | | 6/2009 |
| CN | 101541056 A | | 9/2009 |
| EP | 1863306 A1 | | 5/2007 |
| EP | 1883195 A1 | | 1/2008 |
| EP | 2034660 A1 | | 3/2009 |
| RU | 2335854 C2 | | 10/2008 |
| RU | 2347320 C2 | | 2/2009 |
| WO | 2005027458 A1 | | 3/2005 |
| WO | 2007051787 A1 | | 5/2007 |
| WO | 2008020787 A1 | | 2/2008 |
| WO | 2008080717 A1 | | 7/2008 |
| WO | WO 2008/126565 A1 | | 10/2008 |
| WO | 2009035294 A2 | | 3/2009 |
| WO | 2009069877 A1 | | 6/2009 |
| WO | 2009152861 A1 | | 12/2009 |

OTHER PUBLICATIONS

Office Action issued in corresponding Chinese Patent Application No. 200910147412.7, dated Nov. 9, 2011.
Written Opinion of the International Searching Authority issued in corresponding PCT Patent Application PCT/CN2010/073213, dated Aug. 26, 2010.
International Search Report issued in corresponding PCT Patent Application PCT/CN2010/073213, dated Aug. 26, 2010.
Change Request, 29.274 CR 0303 rev 1, 8.2.0. 3GPP TSG CT4 Meeting #45. Seville, Spain, Aug. 24-28, 2009. C4-092648.
Change Request, 29.274 CR 0303 rev, 8.2.0. 3GPP TSG CT4 Meeting #45. Seville, Spain, Aug. 24-28, 2009. C4-092191.
LTE, "3$^{rd}$ Generation Partnership Project; Technical Specification Group Core Network and Terminal; 3GPP Evolved Packet System (EPS); Evolved General Packet Radio Service (GPRS) Tunnelling Protocol for Control Plane (GTPv2-C)" Stage 3 (Release 8). 3GPP TS 29.274, V8.2.0, Jun. 2009.
LTE, "3$^{rd}$ Generation Partnership Project; Technical Specification Group Services and System Aspects; General Packet Radio Service (GPRS) Enhancements for Evolved Universal Terrestrial Radio Access Network (E-UTRAN) Access" (Release 8). 3GPP TS 23.401, V8.5.0, Mar. 2009.
Communication issued in corresponding European Patent Application No. 10785716.1, dated Oct. 24, 2012.
Office Action issued in commonly owned U.S. Appl. No. 13/675,310, dated Mar. 13, 2013.
Extended European Search Report issued in corresponding European Patent Application No. 10785716.1, dated Feb. 21, 2012.
Huawei, "SGW F-TEID in the TAU Procedure" Change Request 29.274 CR 0303 rev. 1, 8.2.0. 3GPP TSG CT4 Meeting #45, Seville, Spain. Aug. 24-28, 2009. C4-092648.
Huawei, "Location Change Reporting Indication" Change Request 29.274 CR 0075 rev. 1, 8.0.0. 3GPP TSG WG4 Meeting #42, San Antonio, US Feb. 9-19, 2009.C4-090870.
Huawei, "Delete Session Request" Change Request 29.274 CR 0184 rev_, 8.1.1. 3GPP TSG CT WG4 Meeting #42, Sophia Antipolis, France. Apr. 20-24, 2009. C4-091235.
Zte et al., "Delete Session Request Granularity" Change Request 29.274 CR 0177 rev 1, 3GPP TSG CT WG4 Meeting #43, Sophia Antipolis, France. Apr. 20-24, 2009. C4-091544.
LTE, 3$^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 8) 3GPP TS 23.401. V8.6.0, Jun. 2009.
LTE, 3$^{rd}$ Generation Partnership Project; Technical Specification Group Core Network and Terminals; 3GPP Evolved Packet System (EPS); Evolved General Packet Radio Service (GPRS) Tunnelling Protocol for Control Plane (GTPv2-C) Stage 3 (Release 8) 3GPP TS 29.274. V8.2.0, Jun. 2009.
Office Action issued in corresponding Japanese Patent Application No. 2012-514333, dated Apr. 16, 2013.
3GPP TS 29.274 V8.3.0,3rd Generation Partnership Project;Technical Specification Group Core Network and Terminals;3GPP Evolved Packet System (EPS);Evolved General Packet Radio Service (GPRS)Tunnelling Protocol for Control plane (GTPv2-C);Stage 3(Release 8),Sep. 2009.
3GPP TSG CT WG4 Meeting #43 C4-091135,"Modify Bearer Request for TAU without MME or SGW change", Change Request,29.274 CR 0149,Motorola,Apr. 2009,total 6 pages.
3GPP TS 29.060 V8.7.0,3rd Generation Partnership Project;Technical Specification Group Core Network and Terminals;General Packet Radio Service (GPRS);GPRS Tunnelling Protocol (GTP)across the Gn and Gp interface (Release 8),Mar. 2009,total 147 pages.
3GPP TSG-SA WG2 Meeting #73 S2-093984,"Reply LS on the S-GW TEID-U for S1,S4-U and S12",SA2, May 11-15, 2009,total 1 pages.
3GPP TS 23.401 V8.2.0,3rd Generation Partnership Project;Technical Specification Group Services and System Aspects;General Packet Radio Service (GPRS) enhancements for Evolved Universal Terrestrial Radio Access Network (E-UTRAN) access (Release 8),Jun. 2008,total 182 pages.
3GPP TSG CT WG4 Meeting #42 C4-090981,"LS on the S-GW TEID-U for S1,S4-U and S12",Feb. 9-19, 2009,toal 2 pages.
3GPP TSG CT WG4 Meeting #40 C4-082022,"Pseudo-CR on Modity Bearer",Ericsson,Aug. 18-22, 2008,total 18 pages.
3GPP TS 23.060 V9.1.0,3rd Generation Partnership Project;Technical Specification Group Services and System Aspects;General Packet Radio Service (GPRS);Service description;Stage 2(Release 9),Jun. 2009,total 284 pages.
3GPP TSG CT WG4 Meeting #43 C4-091177,"IE corrections in Modify Bearer signalling",Ericsson,29.274 CR 0618, Apr. 20-24,total 10 pages.

* cited by examiner

METHOD, DEVICE, AND SYSTEM FOR CONTROLLING TUNNEL IDENTIFIER ALLOCATION

CROSS-REFERENCE TO RELATED APPLICATIONS

This application is a continuation of International Application No. PCT/CN2010/073213, filed on May 25, 2010, which claims priority to Chinese Patent Application No. 200910147412.7, filed on Jun. 10, 2009, both of which are hereby incorporated by reference in their entireties.

FIELD OF THE INVENTION

The present invention relates to the field of communications technologies, and in particular, to a method, a device, and a system for controlling tunnel identifier allocation.

BACKGROUND OF THE INVENTION

The General Packet Radio Service (GPRS) Tunneling Protocol (GTP) tunnel is an important concept of the GTP tunneling protocol, and is used for forwarding signaling messages and service data packets. The GTP tunnel may be categorized into a user plane tunnel and a control plane tunnel, and the tunnel granularity may be based on a User Equipment (UE), Packet Data Network (PDN) connection, a bearer context, or a Packet Data Protocol (PDP) context. A network element applying the GTP protocol identifies a GTP tunnel through an Internet Protocol (IP) address, a User Datagram Protocol (UDP) port number, and a Tunnel Endpoint Identifier (TEID). The TEID is assigned by this network element for a peer network element to use, and the TEID is exchanged between the network elements through a GTP control plane signaling message or a radio side signaling message. The TEID assigned by the network element is also categorized into a user plane TEID and a control plane TEID.

Due to such reasons as equipment overload, a GTP network element may modify a TEID of an established tunnel through a signaling message, and switches a processing module. For example, GTP network element equipment has sub-processing modules A and B, and if the sub-processing module A is overloaded, the GTP network element modifies a TEID of a tunnel established by a user through a signaling message, and switches the tunnel onto the sub-processing module B; for equipment of multiple IP addresses, if IP addresses of interfaces of the sub-processing modules A and B are different, the IP address of the network element is modified while modifying the TEID.

In an existing Evolved Packet Core (EPS) network, a mobility management network element is in charge of such functions as position management, connection management, security authentication, and gateway selection of a mobile UE, and the mobility management network element may be a Mobility Management Entity (MME) or a Serving GPRS Support Node (SGSN). A Serving Gateway (SGW) is a local access gateway of the UE, and is in charge of connection management and data forwarding relevant to an access technology. The UE accesses the network through a local radio access network, and the access network may be a Universal Terrestrial Radio Access Network (UTRAN)/Global System for Mobile Communications (GSM) Enhanced Data rates for GSM Evolution (EDGE) Radio Access Network (GERAN)/Evolved-UTRAN (E-UTRAN). User plane data packets are directly forwarded between the SGW and an eNodeB, rather than through an MME. However, no direct signaling message interaction exists between the SGW and the eNodeB, establishment/modification/deletion of a GTP user plane tunnel for forwarding the user plane data packets depends on the MME, and the MME is in charge of performing the signaling message interaction between the eNodeB and the SGW, and establishing/modifying/deleting the GTP user plane tunnel between the eNodeB and the SGW.

The SGW carries a user tunnel identifier or the user tunnel identifier and an IP address in a first signaling message, and sends the first signaling message to the MME, the MME carries the user tunnel identifier or the user tunnel identifier and the IP address of the SGW in a second signaling message, and sends the second signaling message to the eNodeB, and subsequently the eNodeB sends relevant data packets to the SGW through a tunnel identified with a corresponding TEID. The MME also stores the TEIDs and the IP address of the SGW.

A direct tunnel mode in SGSN architecture is similar to that in the foregoing scenario. The so-called direct tunnel mode refers to that a user plane tunnel is established between the access network and the SGW, and oppositely, an indirect tunnel mode refers to that a user plane tunnel is established between the SGSN and the SGW.

In such procedures as handover, service request, and re-location, the SGW changes the TEID and/or the IP address, but the eNodeB/Radio Network Subsystem (RNS) cannot obtain the change. The eNodeB/RNS still forwards data packets by using the tunnel identifier and the IP address originally assigned by the SGW, and since the SGW cannot correctly receive/forward the data packets, a data packet loss phenomenon occurs, thereby causing service interruption and influencing user experience. The SGW may return an error indication message to the eNodeB/RNS, and after receiving the message, the eNodeB/RNS deletes corresponding context information, thereby bringing more abnormalities to the network.

SUMMARY OF THE INVENTION

The present invention is directed to a method, a device, and a system for controlling tunnel identifier allocation, so as to control an SGW to modify a TEID and/or an IP address.

A method for controlling tunnel identifier allocation provided in an embodiment of the present invention includes:
determining whether a type of a current procedure allows an SGW to change a TEID and/or an IP address; and
sending a modify bearer request message to the SGW, in which the modify bearer request message is used for notifying the SGW of whether the SGW is allowed to change the TEID and/or the IP address.

Another method for controlling tunnel identifier allocation provided in another embodiment of the present invention includes:
receiving a modify bearer request message sent by a mobility management network element, in which the modify bearer request message is used for notifying whether the TEID and/or the IP address is allowed to be changed; and
sending a modify bearer response message carrying the modified TEID and/or IP address to the mobility management network element, if the TEID and/or the IP address is allowed to be changed.

A mobility management network element provided in an embodiment of the present invention includes:

a determination unit, configured to determine whether a type of a current procedure allows an SGW to change a TEID and/or an IP address; and a sending unit, configured to send a modify bearer request message to the SGW, in which the modify bearer request message is used for notifying the SGW of whether the SGW is allowed to change information of the TEID and/or the IP address.

An SGW further provided in an embodiment of the present invention includes:

a receiving unit, configured to receive a modify bearer request message sent by a mobility management network element, in which the modify bearer request message is used for notifying the SGW of whether a TEID and/or an IP address is allowed to be changed; and a sending unit, configured to send a modify bearer response message carrying the modified TEID and/or IP address to the mobility management network element, if the TEID and/or the IP address is allowed to be changed.

A system for controlling tunnel identifier allocation provided in an embodiment of the present invention includes:

a mobility management network element, configured to determine whether a type of a current procedure allows an SGW to change a TEID and/or an IP address; and send a modify bearer request message to the SGW, in which the modify bearer request message is used for notifying the SGW of whether the SGW is allowed to change information of the TEID and/or the IP address; and the SGW, configured to receive the modify bearer request message sent by the mobility management network element, in which the modify bearer request message is used for notifying whether the TEID and/or the IP address is allowed to be changed; and send a modify bearer response message carrying the modified TEID and/or IP address to the mobility management network element, if the TEID and/or the IP address is allowed to be changed.

According to the embodiments of the present invention, for a type of a current procedure, a modify bearer request message sent by a mobility management network element to an SGW carries information indicating whether a TEID and/or an IP address is allowed to be changed, so that the SGW may be controlled to modify the TEID and/or the IP address subsequently, thereby avoiding the influence on user service data transmission caused by the SGW modifying the TEID and/or the IP address without permission, and ensuring the effect of user experience.

DETAILED DESCRIPTION OF THE EMBODIMENTS

In order to make the objectives, technical solutions, and advantages of the present invention more comprehensible, the present invention is further illustrated in detail below with reference to embodiments and the accompanying drawings. Here, the exemplary embodiments and the illustrations of the present invention are only intended to explain the present invention, rather than to limit the present invention.

Embodiment 1

Figure 1:
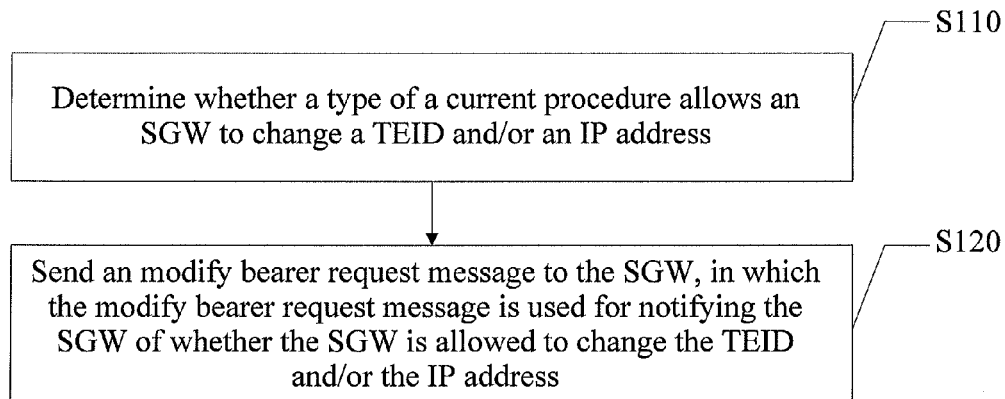
FIG. 1 is a flow chart of a method for controlling tunnel identifier allocation according to Embodiment 1 of the present invention.

In an embodiment, the present invention provides a method for controlling tunnel identifier allocation. As shown in FIG. 1, the method includes the following steps.

Step S110: Determine whether a type of a current procedure allows an SGW to change a TEID and/or an IP address.

In different current procedures, a mobility management network element receives different front messages, determines the specific type of a current procedure according to the received front message, and further determines whether the SGW is allowed to change the TEID and/or the IP address. The front message refers to the messages sent by a UE, an access network, or another mobility management network element and received by the mobility management network element before sending a modify bearer request message to the SGW in the type of the current procedure. The type of the current procedure includes procedures such as attach, service request, handover, re-location, PDN connectivity requested by the UE, PDP context activation, tracking area update, and routing area update. The mobility management network element includes an MME or an SGSN. For example, the UE initiates an attach procedure, and after receiving an attach request sent by an access network, the mobility management network element obtains that the type of the current procedure is the attach procedure; while for the attach procedure, the SGW is not allowed to change the TEID and/or the IP address. In addition to the attach procedure, for a procedure such as service request, handover, re-location, PDN connection establishment, or PDP context activation, the SGW is also not allowed to change the TEID and/or the IP address.

If the type of the current procedure is the routing area update procedure or the tracking area update procedure, the SGW is allowed to change the TEID and/or the IP address.

Step S120: Send a modify bearer request message to the SGW, in which the modify bearer request message is used for notifying the SGW of whether the SGW is allowed to change information of the TEID and/or the IP address.

The mobility management network element sending the modify bearer request message to the SGW for notifying the SGW of whether the SGW is allowed to change the TEID and/or the IP address may be implemented in the following manners.

1. It may be implemented through a newly added information element or an extended information element. The following manners are included.

In Manner 1, the modify bearer request message carries an indication, which indicates that the SGW cannot change the TEID and/or the IP address, and when the modify bearer request message does not carry the indication, the SGW is allowed to modify the TEID and/or the IP address.

In Manner 2, the modify bearer request message carries an indication, which indicates that the SGW may change the TEID and/or the IP address, and when the modify bearer request message does not carry the indication, the SGW is not allowed to change the TEID and/or the IP address.

In Manner 3, the modify bearer request message carries two different indications, which respectively indicate that the SGW is allowed or not allowed to modify the TEID and/or the IP address.

2. It may also be implemented according to an existing procedure. The modify bearer request message carrying or not carrying the TEID and/or the IP address assigned by the access network is sent to the SGW, in which if the TEID and/or the IP address is carried, it indicates that the SGW is not allowed to modify the TEID and/or the IP address; while if the TEID and/or the IP address is not carried, it indicates that the SGW is allowed to modify the TEID and/or the IP address.

According to the embodiment of the present invention, for the type of the current procedure, the mobility management network element notifies whether the information of the TEID and/or the IP address is allowed to be changed through the modify bearer request message sent to the SGW, thereby avoiding the influence on user service data transmission caused by the SGW modifying the TEID and/or the IP address, and ensuring the effect of user experience.

Embodiment 2

Figure 2:
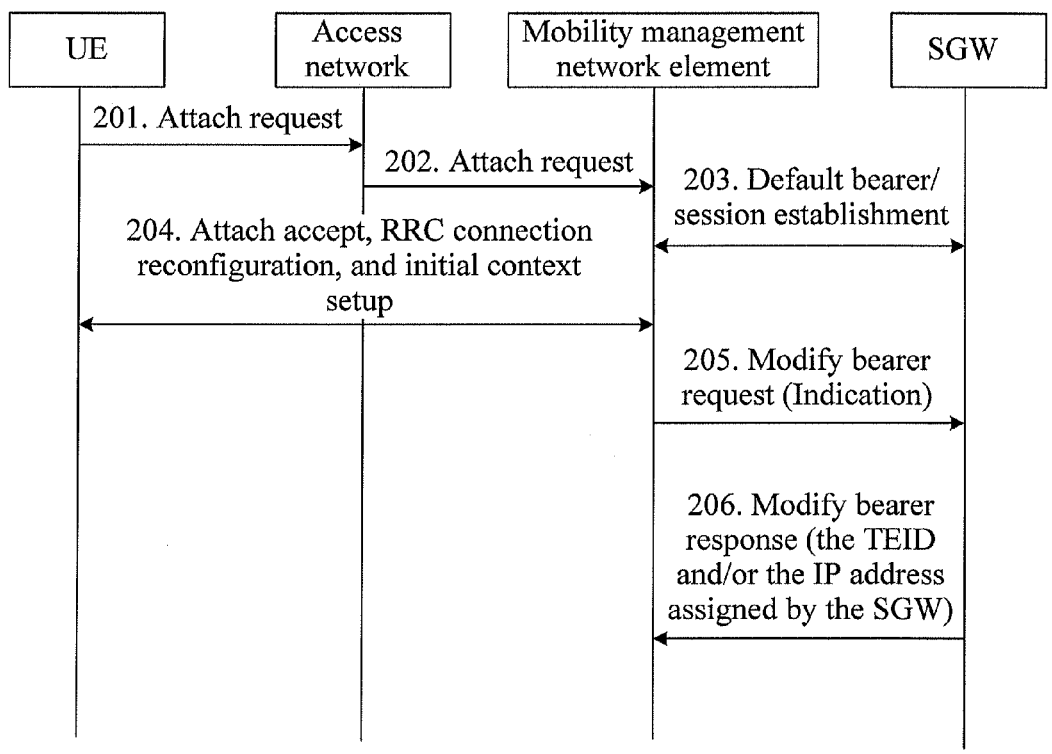
FIG. 2 is a flow chart of a method for controlling tunnel identifier allocation according to Embodiment 2 of the present invention.

In this embodiment, by taking an attach procedure as an example, a method for controlling tunnel identifier allocation according to the present invention is further explained and illustrated. As shown in FIG. 2, the method of this embodiment includes the following steps.

Step 201: A UE initiates an attach procedure, and the UE sends an attach request to an access network.

Step 202: The access network sends the attach request to a mobility management network element.

Step 203: A default bearer is established between the mobility management network element and an SGW.

Step 204: Such operations as Radio Resource Control (RRC) configuration and initial context setup are performed among the mobility management network element, the access network, and the UE, and the mobility management network element sends an attach accept message to the UE.

Step 205: After receiving the attach request sent by the access network, the mobility management network element obtains that the type of the current procedure is the attach procedure. In this case, the SGW is not allowed to change the TEID and/or the IP address. Specifically, the mobility management network element notifying the SGW may be implemented in one of the following manners.

1. It may be implemented through a newly added information element or an extended information element. The following manners are included.

In Manner 1, the mobility management network element carries an indication in a modify bearer request message sent to the SGW, which indicates that the SGW cannot change the TEID and/or the IP address.

In Manner 2, the modify bearer request message does not carry any indication, which indicates that the SGW is not allowed to modify the TEID and/or the IP address.

In Manner 3, the mobility management network element carries one of two different indications denoting unallowable in a modify bearer request message sent to the SGW, which indicates that the SGW is not allowed to modify the TEID and/or the IP address.

In the foregoing three manners, specifically, the indication information may be implemented through a newly added information element or an extended information element.

2. The mobility management network element may also implement according to an existing procedure, and send the modify bearer request message carrying the TEID and/or the IP address assigned by the access network to the SGW.

Step 206: After receiving the modify bearer request message, the SGW obtains that the TEID and/or the IP address is not allowed to be modified (corresponding to Manner 2 defined in Step 205, through the message not carrying the indication, the SGW obtains that the TEID and/or the IP address is not allowed to be modified), and the SGW does not change the TEID and/or the IP address.

According to the modify bearer request message carrying the TEID and/or the IP address assigned by the access network, the SGW regards that the type of the current procedure does not allow changing the TEID and/or the IP address assigned by the SGW, and the SGW does not change the TEID and/or the IP address.

In this embodiment, after receiving an attach request sent by an access network, the mobility management network element obtains that the type of the current procedure is the attach procedure. In the procedure, the SGW is not allowed to change the TEID and/or the IP address, so that not only the loss of service data packets of a user or the service interruption caused by the SGW modifying the TEID and/or the IP address may be avoided, but also the operation complexity in some cases may be simplified.

Embodiment 3

Figure 3:
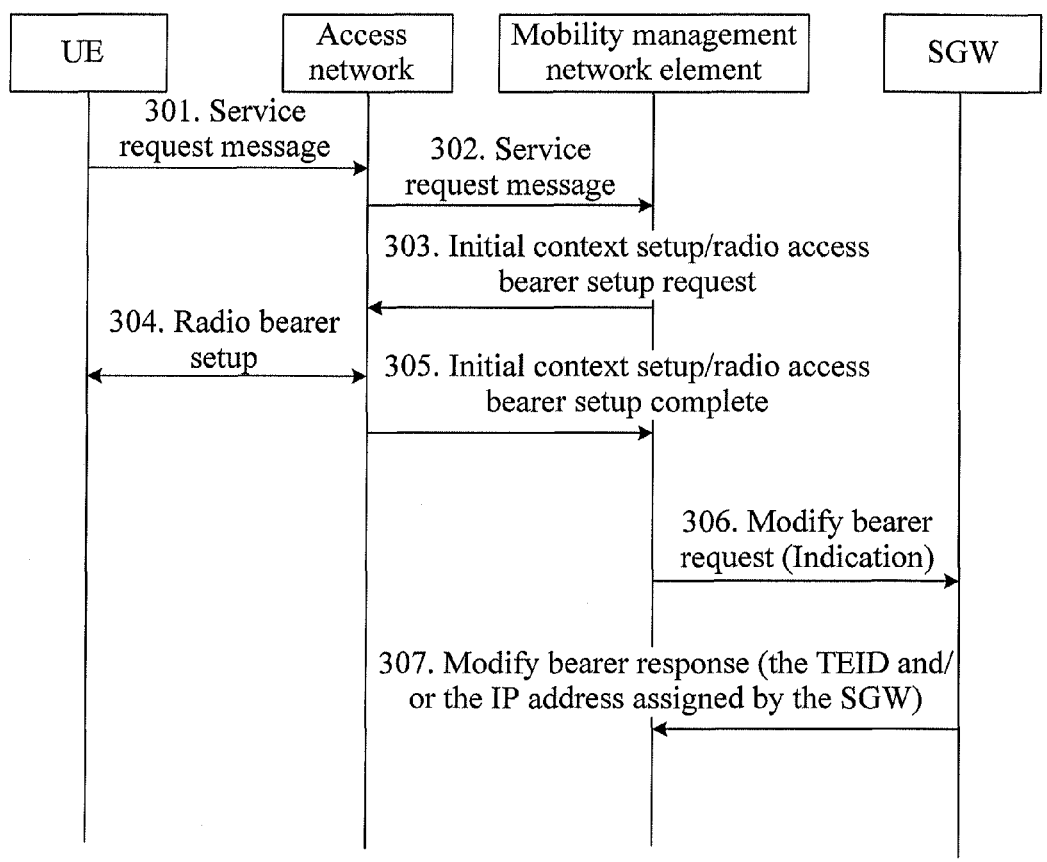
FIG. 3 is a flow chart of a method for controlling tunnel identifier allocation according to Embodiment 3 of the present invention.

In this embodiment, by taking a service request procedure as an example, a method for controlling tunnel identifier allocation according to the present invention is further explained and illustrated, and the procedure may also be a service request procedure triggered by network side paging. As shown in FIG. 3, the method of this embodiment includes the following steps.

Step 301: A UE sends a service request message to an access network.

Step 302: The access network sends the service request message to a mobility management network element.

Step 303: The mobility management network element sends an initial context setup request or radio access bearer assignment request message to the access network, so as to establish a radio access bearer between the mobility management network element or an SGW and the access network.

Step 304: A radio bearer is established between the access network and the UE.

Step 305: The access network sends an initial context setup complete or radio access bearer assignment response message to the mobility management network element. This step provides a response message of Step 303.

Step 306: According to the received service request message sent by the access network, the mobility management network element obtains that the currently ongoing procedure is the service request procedure.

If the mobility management network element is an MME, it means that before sending the modify bearer request message to the SGW, the MME has sent the TEID and/or the IP address assigned by the SGW to the access network. In this case, the SGW is not allowed to change the TEID and/or the IP address, and the MME notifying the SGW may be specifically implemented in one of the methods defined in Embodiment 2. If the mobility management network element is an SGSN, the following two situations exist.

1. The SGSN does not allow the SGW to change the TEID and/or the IP address.

2. The SGSN still needs to further determine whether the SGW is allowed to change the TEID and/or the IP address according to such information as a terminal state, a request type, a direct tunnel mode, or a data storage condition. The SGSN determines a state of the UE when this procedure is initiated. If the UE is in an idle state, and the UE requests to establish a signaling connection, in this case, the SGW is allowed to change the TEID and/or the IP address. If the UE is in the idle state, the UE requests to restore the PDP context, and it is in the direct tunnel mode currently, in this case, the SGW is not allowed to change the TEID and/or the IP address. If the UE is in the idle state, the UE requests to restore the PDP context, and it is in the indirect tunnel mode currently, in this case, the SGW is allowed to change the TEID and/or the IP address. If the UE is in the connection state, in the case of the indirect tunnel mode, the SGSN allows the SGW to change the TEID and/or the IP address. If the UE is in the connection state, in the case of the direct tunnel mode, the SGSN determines that, for which PDN connections, a Radio Network Controller (RNC) stores the TEID and the IP address assigned by the SGW, and for which PDN connections, the RNC does not store the TEID and the IP address assigned by the SGW. For the PDN connections that the RNC stores the TEID and the IP address assigned by the SGW, the SGW is not allowed to change the TEID and/or the IP address. For the PDN connections that the RNC does not store the TEID and the IP address assigned by the SGW, the SGW is allowed to change the TEID and/or the IP address. The SGSN obtains a tunnel state between the SGW and the access network, the TEID and the IP address assigned by the SGW are sent to the access network through the SGSN, and the SGW is notified of the access network releasing a tunnel also through the SGSN. The SGSN is capable of obtaining whether the RNC stores the TEID and the IP address assigned by the SGW.

The SGSN notifying the SGW may be specifically implemented in one of the methods defined in Embodiment 1.

Step 307: The SGW parses indication information in the modify bearer request message, and if the indication information allows modifying the TEID and/or the IP address, the SGW carries the changed TEID in a corresponding modify bearer response message, which may further include the IP address.

Further, if the indication information allows modifying the TEID and/or the IP address, the SGW currently needs to modify the TEID and/or the IP address due to such reasons as overload according to a policy of the SGW. The SGW carries the changed TEID in the returned modify bearer response message, which may further include the changed IP address.

The SGW may also obtain whether the type of the current procedure allows changing the TEID and/or the IP address according to whether the modify bearer request message carries the TEID and/or the IP address assigned by the access network. If the modify bearer request message carries the TEID and/or the IP address assigned by the access network, the SGW regards that the type of the current procedure does not allow changing the TEID and/or the IP address assigned by the SGW. If the modify bearer request message does not carry the TEID and/or the IP address assigned by the access network, the SGW regards that the type of the current procedure allows changing the TEID and/or the IP address assigned by the SGW.

When the SGW is allowed to change the assigned TEID and/or IP address, the SGW carries the changed TEID and/or IP address in the corresponding modify bearer response message. Moreover, when the SGW needs to change the TEID and/or the IP address due to such reasons as overload according to a policy of the SGW, the SGW may also carry the changed TEID and/or IP address in the corresponding modify bearer response message.

For the direct tunnel mode, after receiving the TEID and/or the IP address carried by the SGW in the modify bearer response message, the mobility management network element subsequently sends the TEID and/or the IP address to the access network. For example, the mobility management network element sends the TEID and/or the IP address assigned by the SGW to the access network through such procedures as the PDP context update procedure and the routing area update procedure. For the indirect tunnel mode, the mobility management network element locally updates the TEID and/or the IP address assigned by the SGW. In the procedure that the SGW is allowed to change the TEID and/or the IP address, the access network already releases the user plane tunnel between the SGW and the access network, or a user plane tunnel is established between the SGW and the SGSN, and therefore, the SGW changing the TEID and/or the IP address does not influence the services.

In this embodiment, it is determined whether the SGW is allowed to change the TEID and/or the IP address through such information as a type of a current procedure, a terminal state, a request type, a direct tunnel mode, or a data storage condition, so that not only the loss of service data packets of a user or the service interruption may be avoided, but also the operation complexity in some cases may be simplified.

Embodiment 4

Figure 4:
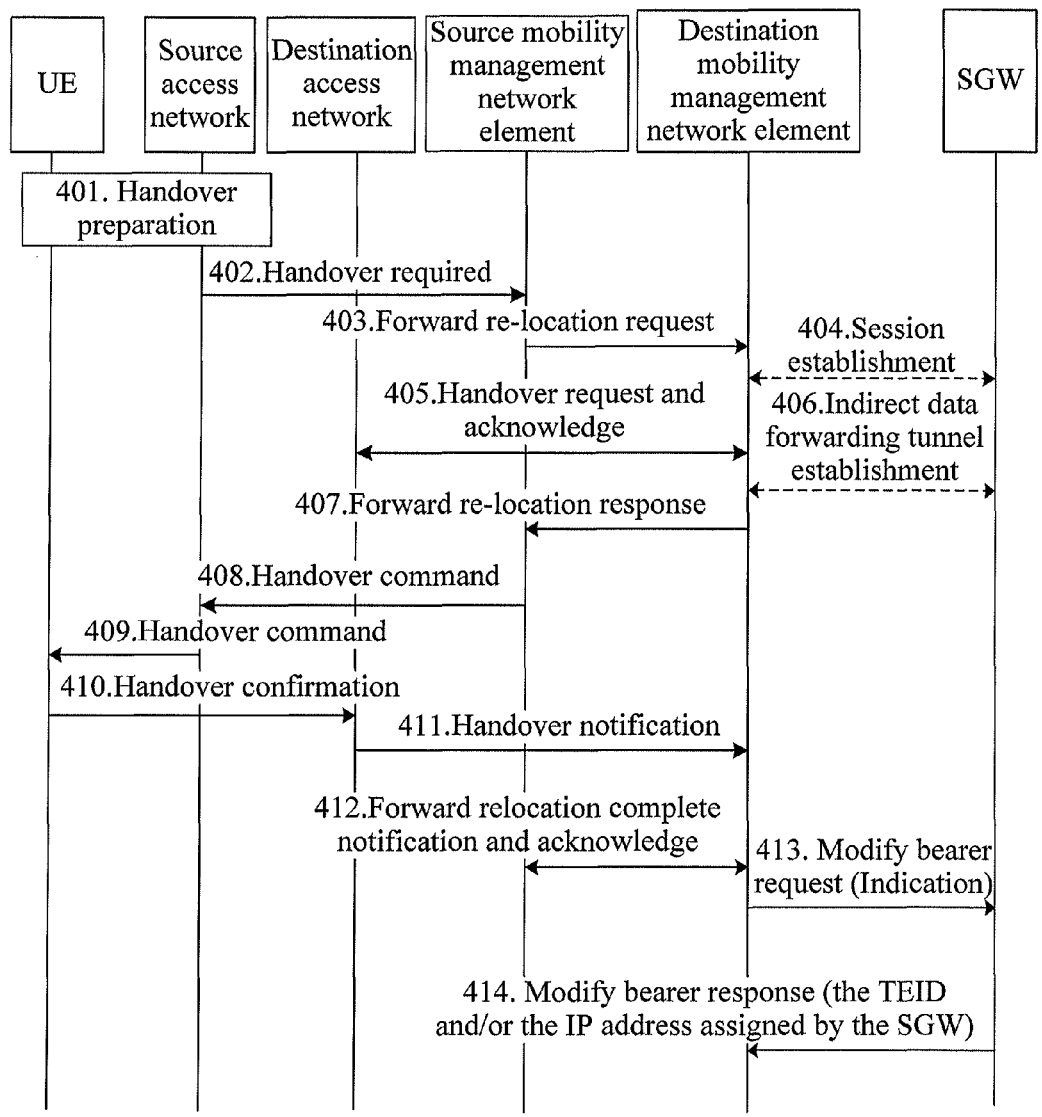
FIG. 4 is a flow chart of a method for controlling tunnel identifier allocation according to Embodiment 4 of the present invention.

In this embodiment, taking handover and re-location procedures as an example, a method for controlling tunnel identifier allocation according to the present invention is further explained and illustrated. As shown in FIG. 4, the handover and re-location procedures are procedures caused due to such reasons as mobility of a UE in a connection state corresponding to the S1/X2 handover, the Inter Radio Access Type (RAT), the serving RNS re-location procedure, the PS handover procedure, the handover/re-location procedure from a Gn/Gp SGSN to an MME/S4 SGSN, the combined hard handover and serving RNS re-location procedure, and the enhanced serving RNS re-location procedure. The method of this embodiment includes the following steps.

Step 401: The UE and a source access network make handover preparation.

Step 402: The source access network sends a handover required message to a source mobility management network element.

Step 403: The source mobility management network element sends a forward re-location request message to a target mobility management network element.

Step 404: If an SGW is changed, a session is established between the target mobility management network element and the SGW.

Step 405: The target mobility management network element sends the handover request message to a target access network, and then receives a handover request acknowledge message returned by the target access network.

Step 406: An indirect data forwarding tunnel is established between the target mobility management network element and the SGW, and this step is an optional step.

Step 407: The target mobility management network element sends a forward re-location response message to the source mobility management network element.

Step 408: The source mobility management network element sends the handover command message to the source access network.

Step 409: The source access network sends the handover command message to the UE.

Step 410: The UE sends the handover confirmation message to the target access network.

Step 411: The target access network sends a handover notification message to the target mobility management network element.

Step 412: The target mobility management network element sends a forward re-location complete notification message to the source mobility management network element, and then receives a forward re-location complete acknowledge message returned by the source mobility management network element.

Step 413: After receiving the forward re-location request message, the target mobility management network element obtains it is in the handover/re-location procedure currently. If the mobility management network element is an MME, it means that before sending the modify bearer request message to the SGW, the MME has sent the TEID and/or the IP address assigned by the SGW to the access network. In this case, the SGW is not allowed to change the TEID and/or the IP address. The MME notifying the SGW may be specifically implemented in one of the methods defined in Embodiment 2. If the mobility management network element is an SGSN, the following two situations exist.

1. The SGSN does not allow the SGW to change the TEID and/or the IP address.

2. The SGSN further determines whether the SGW is allowed to modify the TEID and/or the IP address according to the data storage condition and the tunnel mode. In the case of the indirect tunnel mode, the SGSN allows the SGW to change the TEID and/or the IP address. In the case of the direct tunnel mode, the SGSN determines that, for which PDN connections, the RNC stores the TEID and the IP address assigned by the SGW, and for which PDN connections, the RNC does not store the TEID and the IP address assigned by the SGW. For the PDN connections that the RNC stores the TEID and the IP address assigned by the SGW, the SGW is not allowed to change the TEID and/or the IP address. For the PDN connections that the RNC does not store the TEID and the IP address assigned by the SGW, SGW is allowed to change the TEID and/or the IP address.

The SGSN notifying the SGW may be specifically implemented in one of the methods defined in Embodiment 1.

Step 414: The SGW parses indication information in the modify bearer request message, and if the indication information allows modifying the TEID and/or the IP address, the SGW carries the changed TEID in a corresponding modify bearer response message, which may further include the IP address.

Further, if the indication information allows modifying the TEID and/or the IP address, the SGW currently needs to modify the TEID and/or the IP address due to such reasons as overload according to a policy of the SGW. In the case that no IP address is varied, the SGW carries the changed TEID in the answered modify bearer response message, which may not include the changed IP address; while in the case that an IP address is varied, the SGW carries the changed TEID in the answered modify bearer response message, which may further include the changed IP address.

The SGW may also determine whether the type of the current procedure allows changing the TEID and/or the IP address according to whether the modify bearer request message carries the TEID and/or the IP address assigned by the access network. If the modify bearer request message carries the TEID and/or the IP address assigned by the access network, the SGW regards that the type of the current procedure does not allow changing the TEID and/or the IP address assigned by the SGW. If the modify bearer request message does not carry the TEID and/or the IP address assigned by the access network, the SGW regards that the type of the current procedure allows changing the TEID and/or the IP address assigned by the SGW.

When the SGW is allowed to change the assigned TEID and/or IP address, the SGW carries the changed TEID and/or IP address in the corresponding modify bearer response message. Moreover, when the SGW needs to change the TEID and/or the IP address due to such reasons as overload according to a policy of the SGW, the SGW may also carry the changed TEID and/or IP address in the corresponding modify bearer response message.

In the direct tunnel mode, after receiving the TEID and/or the IP address carried by the SGW in the modify bearer response message, the SGSN subsequently sends the TEID and/or the IP address to the access network. For example, the SGSN sends the TEID and/or the IP address assigned by the SGW to the access network by using a PDP update procedure or a service request procedure. In the indirect tunnel mode, the SGSN locally updates the TEID and/or the IP address assigned by the SGW. In the procedure that the SGW is allowed to change the TEID and/or the IP address, the access network already releases the user plane tunnel between the SGW and the access network, or a user plane tunnel is established between the SGW and the SGSN, and therefore, the SGW changing the TEID and/or the IP address does not influence the services.

In this embodiment, after receiving the forward re-location request message, the target mobility management network element obtains it is in the handover/re-location procedure currently, so as to determine whether the SGW is allowed to change the TEID and/or the IP address; thereby, not only the loss of service data packets of a user or the service interruption may be avoided, but also the operation complexity in some cases may be simplified.

Embodiment 5

In this embodiment, by taking a PDN connection establishment procedure as an example, a method for controlling tunnel identifier allocation according to the present invention is further explained and illustrated.

Figure 5:
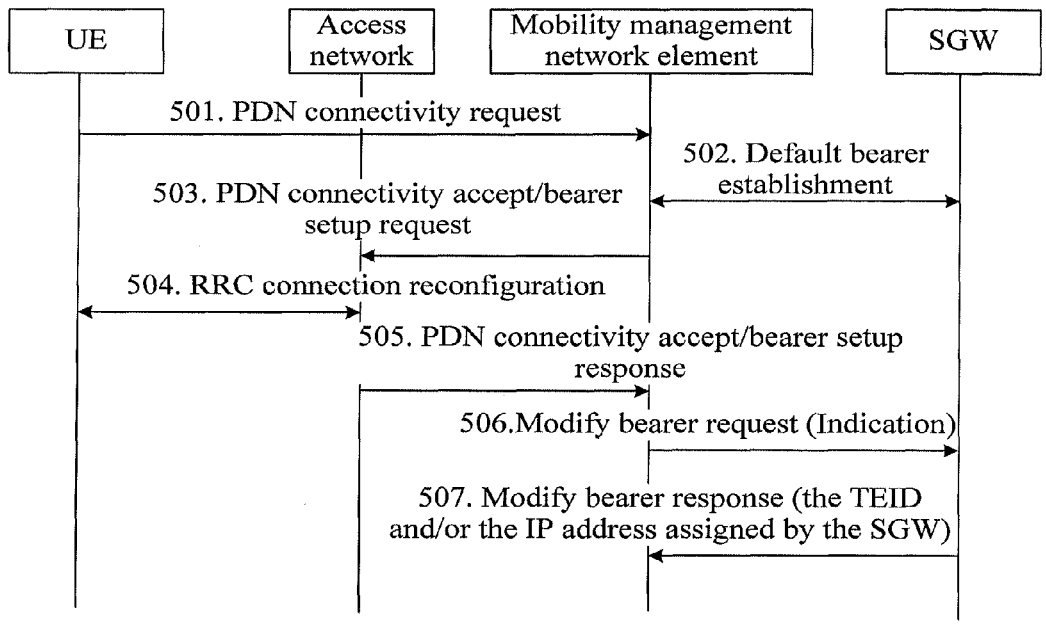
FIG. 5 is a flow chart of a method for controlling tunnel identifier allocation according to Embodiment 5 of the present invention.

As shown in FIG. 5, the method of this embodiment includes the following steps.

Step 501: A UE requests the PDN connection establishment procedure, and the UE sends a PDN connectivity request to a mobility management network element. The request message is sent to the mobility management network element through an access network.

Step 502: A default bearer is established between the mobility management network element and an SGW.

Step 503: The mobility management network element sends a bearer setup request to the access network, in which the bearer setup request contains a PDN connectivity accept message sent to the UE.

Step 504: RRC connection reconfiguration is performed between the access network and the UE.

Step 505: The access network sends a bearer setup response message to the mobility management network element, in which the bearer setup response message contains the PDN connection complete message sent by the UE to the mobility management network element.

Step 506: After receiving the PDN connectivity request message, the mobility management network element obtains that it currently is the PDN connection establishment procedure requested by the UE. If the mobility management network element obtains that it currently is the PDN connection establishment requested by the UE, it means that before sending the modify bearer request message to the SGW, the mobility management network element already sends the TEID and the IP address assigned by the SGW to the access network. In this case, the SGW is not allowed to change the TEID and/or the IP address. The mobility management network element notifying the SGW may be specifically implemented in one of the methods defined in Embodiment 2.

Step 507: The SGW parses indication information in the modify bearer request message, and the indication information does not allow the SGW to change the TEID and/or the IP address.

The SGW may also obtain that the type of the current procedure does not allow changing the TEID and/or the IP address assigned by the SGW according to the modify bearer request message carrying the TEID and/or the IP address assigned by the access network.

The SGW sends the modify bearer response message to the mobility management network element, and the message does not carry the TEID and/or the IP address.

In this embodiment, by obtaining that it currently is the PDN connection establishment procedure requested by the UE, it is determined whether the SGW is allowed to change the TEID and/or the IP address, so that not only the loss of service data packets of a user or the service interruption may be reduced, but also the operation complexity in some cases may be simplified.

Embodiment 6

In this embodiment, by taking a PDP context activation request procedure as an example, a method for controlling tunnel identifier allocation according to the present invention is further explained and illustrated.

Figure 6:
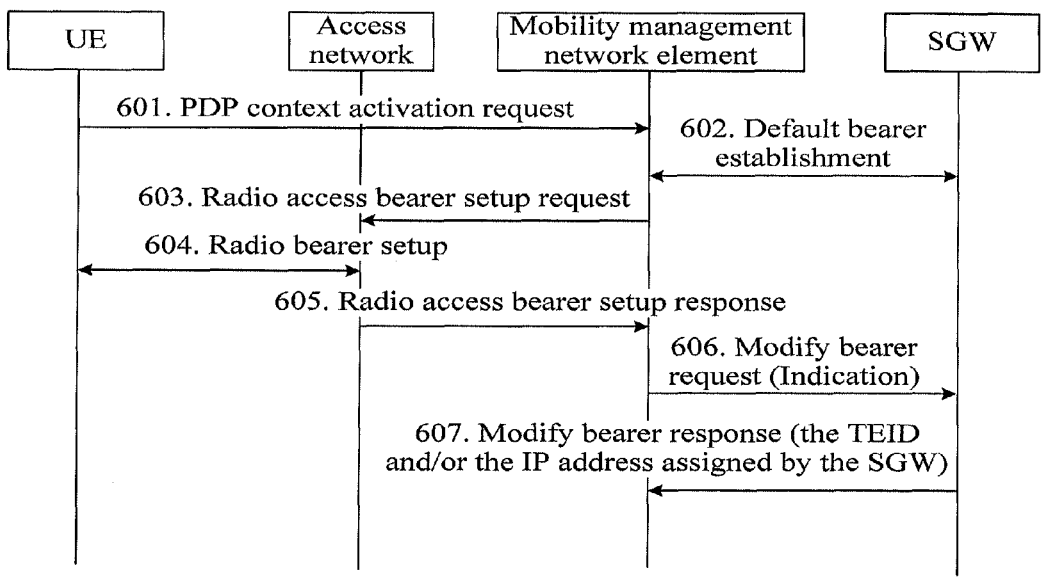
FIG. 6 is a flow chart of a method for controlling tunnel identifier allocation according to Embodiment 6 of the present invention.

As shown in FIG. 6, the method of this embodiment includes the following steps.

Step 601: A UE initiates a PDP context activation request procedure, the UE sends a activate PDP context request message to a mobility management network element, and the message is sent to the mobility management network element through an access network.

Step 602: A default bearer is established between the mobility management network element and an SGW.

Step 603: The mobility management network element sends a radio access bearer setup request to the access network, so as to establish a radio access bearer between the mobility management network element/SGW and the access network.

Step 604: The access bearer is established between the access network and the UE.

Step 605: The access network sends a radio access bearer setup response message to the access network, and this message is a response message of Step 603.

Step 606: After receiving a first message, the mobility management network element obtains that the type of the current procedure is the PDP context activation procedure initiated by the UE. If the mobility management network element obtains that it currently is the PDP context activation procedure, the following two situations exist.

1. The SGW is not allowed to change the TEID and/or the IP address.

2. The mobility management network element further determines whether the SGW is allowed to change the TEID and/or the IP address according to such information as the tunnel mode. The mobility management network element obtains whether it is the direct tunnel mode. If it is the direct tunnel mode, it means that before sending the modify bearer request to the SGW, the mobility management network element already sends the TEID and the IP address assigned by the SGW to the access network. In this case, the SGW is not allowed to change the TEID and/or the IP address. If it is not the direct tunnel mode, in this case, the SGW is allowed to change the TEID and/or the IP address.

The mobility management network element notifying the SGW may be specifically implemented in one of the methods defined in Embodiment 2.

Step 607: The SGW parses indication information in the modify bearer request message, and if the indication information allows modifying the TEID and/or the IP address, the SGW carries the changed TEID in a corresponding modify bearer response message, which may further include the IP address.

Further, if the indication information allows modifying the TEID and/or the IP address, the SGW currently needs to modify the TEID and/or the IP address due to such reasons as overload according to a policy of the SGW. The SGW carries the changed TEID in the answered modify bearer response message, which may further include the changed IP address.

The SGW may also determine whether the type of the current procedure allows changing the TEID and/or the IP address according to whether the modify bearer request message carries the TEID and/or the IP address assigned by the access network. If the modify bearer request message carries the TEID and/or the IP address assigned by the access network, the SGW regards that the type of the current procedure does not allow changing the TEID and/or the IP address assigned by the SGW. If the modify bearer request message does not carry the TEID and/or the IP address assigned by the access network, the SGW regards that the type of the current procedure allows changing the TEID and/or the IP address assigned by the SGW.

When the SGW is allowed to change the assigned TEID and/or IP address, the SGW carries the changed TEID and/or IP address in the corresponding modify bearer response message. Moreover, when the SGW needs to change the TEID and/or the IP address due to such reasons as overload according to a policy of the SGW, the SGW may also carry the changed TEID and/or IP address in the corresponding modify bearer response message.

After receiving the TEID and/or the IP address carried by the SGW in the modify bearer response message, the mobility management network element locally updates the TEID and/or the IP address assigned by the SGW. In the procedure that the SGW is allowed to change the TEID and/or the IP address, a user plane tunnel is established between the SGW and the mobility management network element, and therefore, the SGW changing the TEID and/or the IP address does not influence the services.

In this embodiment, for the tunnel mode, it is determined whether the SGW is allowed to change the TEID and/or the IP address, so that not only the loss of service data packets of a user or the service interruption may be avoided, but also the operation complexity in some cases may be simplified.

Embodiment 7

In this embodiment, by taking a tracking area update procedure in an evolved packet switched network (EPS, Evolved Packet System) as an example, a method for controlling tunnel identifier allocation according to the present invention is further explained and illustrated.

Figure 7:
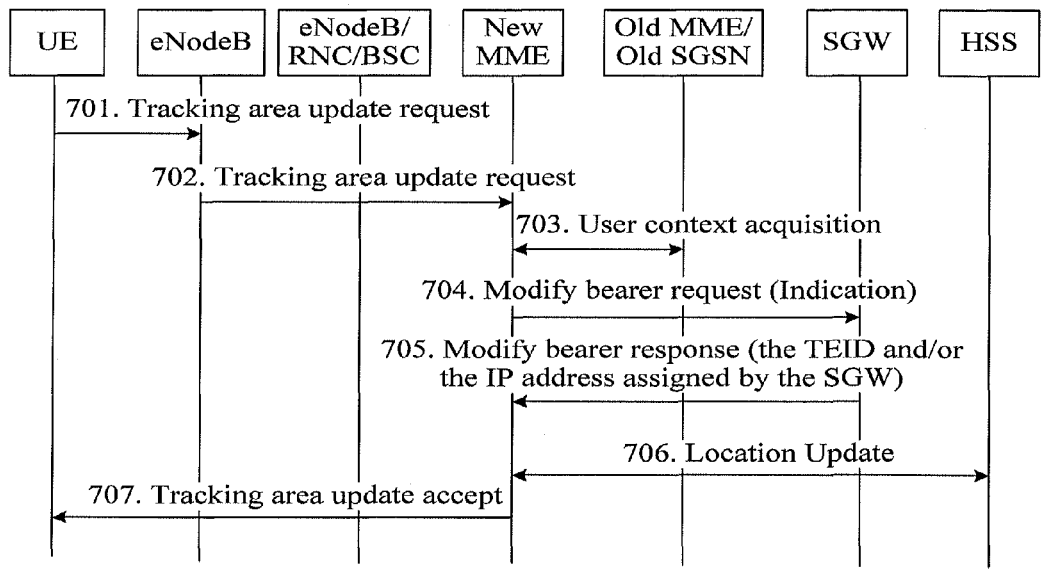
FIG. 7 is a flow chart of a method for controlling tunnel identifier allocation according to Embodiment 7 of the present invention.

As shown in FIG. 7, the method of this embodiment includes the following steps.

Step 701: A UE sends a tracking area update request message to an eNodeB in a connection state or an idle state.

Step 702: The eNodeB sends the message to an MME.

Step 703: A new MME obtains a user context, and if the MME is not changed, the step is not performed.

Step 704: The new MME obtains that this procedure is a tracking area update procedure through the tracking area update request message, and the following two situations exist.

1. The SGW is allowed to modify the TEID and/or the IP address.

2. The MME further decides whether the SGW is allowed to change the TEID and/or the IP address according to state information of the UE. The MME further maintains the state information of the UE, and if the MME determines that the UE in an idle state initiates a tracking area update procedure, it indicates that the eNodeB does not store the TEID and the IP address assigned by the SGW. In this case, the SGW is allowed to modify the TEID and/or the IP address. If the MME determines that the UE in a connection state initiates a tracking area update procedure, it indicates that the eNodeB stores the TEID and the IP address assigned by the SGW. In this case, the SGW is not allowed to modify the TEID and/or the IP address.

The MME notifying the SGW may be specifically implemented in one of the methods defined in Embodiment 1.

Step 705: The SGW parses indication information in an modify bearer request message, and if the indication information allows modifying the TEID and/or the IP address, the SGW carries the changed TEID in a corresponding modify bearer response message, which may further include the IP address.

Further, if the indication information allows modifying the TEID and/or the IP address, the SGW currently needs to modify the TEID and/or the IP address due to such reasons as overload according to a policy of the SGW. The SGW carries the changed TEID in the answered modify bearer response message, which may further include the changed IP address.

The SGW may also determine whether the type of the current procedure allows changing the TEID and/or the IP address according to whether the modify bearer request message carries the TEID and/or the IP address assigned by the eNodeB. If the modify bearer request message carries the TEID and/or the IP address assigned by the eNodeB, the SGW regards that the type of the current procedure does not allow changing the TEID and/or the IP address assigned by the SGW. If the modify bearer request message does not carry the TEID and/or the IP address assigned by the eNodeB, the SGW regards that the type of the current procedure allows changing the TEID and/or the IP address assigned by the SGW.

When the SGW is allowed to change the assigned TEID and/or IP address, the SGW carries the changed TEID and/or IP address in the corresponding modify bearer response message. Moreover, when the SGW needs to change the TEID and/or the IP address due to such reasons as overload according to a policy of the SGW, the SGW may also carry the changed TEID and/or IP address in the corresponding modify bearer response message.

Step 706: A location update procedure is performed.

Step 707: The MME sends a tracking area update accept message to the UE.

After receiving the TEID and/or the IP address carried by the SGW in the modify bearer response message, the MME subsequently sends the TEID and/or the IP address to the eNodeB. For example, in a subsequent service request procedure, the MME sends the TEID and the IP address assigned by the SGW to the eNodeB. In the procedure that the SGW is allowed to change the TEID and/or the IP address, the eNodeB already releases user plane tunnels between the SGW and the eNodeB, and therefore, the SGW changing the TEID and/or the IP address does not influence the services.

In this embodiment, the MME obtains that the UE in the idle state initiates the tracking area update procedure, so as to determine whether the SGW is allowed to change the TEID and/or the IP address; thereby, not only the loss of service data packets of a user or the service interruption may be reduced, but also the operation complexity in some cases may be simplified.

Embodiment 8

In this embodiment, by taking a routing area update procedure as an example, a method for controlling tunnel identifier allocation according to the present invention is further explained and illustrated.

Figure 8:
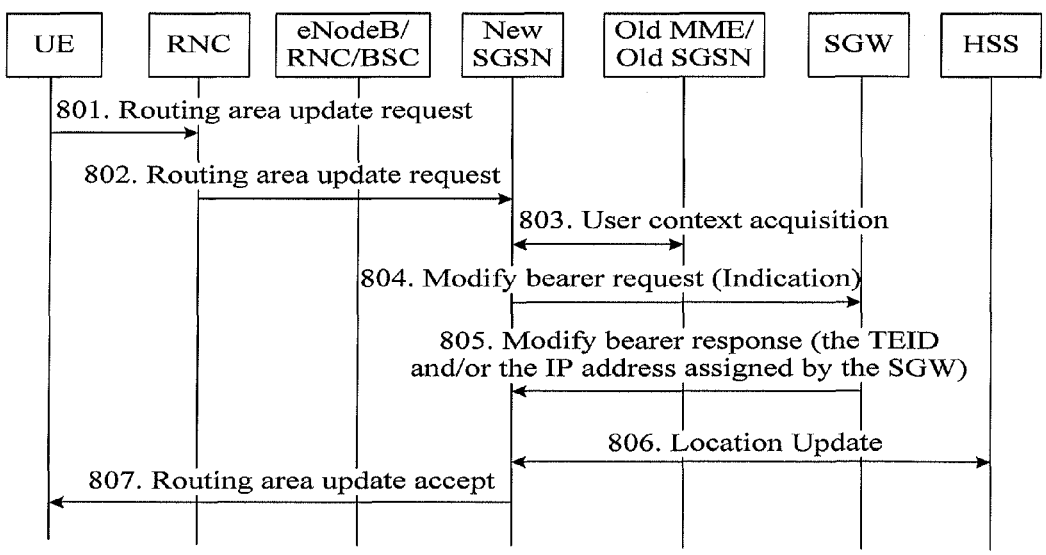
FIG. 8 is a flow chart of a method for controlling tunnel identifier allocation according to Embodiment 8 of the present invention.

As shown in FIG. 8, the method of this embodiment includes the following steps.

Step 801: A UE sends a routing area update request message to an RNC in a connection state or an idle state.

Step 802: The RNC sends the message to an SGSN.

Step 803: A new SGSN obtains a user context, and if the SGSN is not changed, the procedure is not performed.

Step 804: After receiving a routing area update request message sent by an access network, the SGSN obtains that this procedure is a routing area update procedure, and the following three situations exist.

1. The SGW is allowed to modify the TEID and/or the IP address.

2. The SGSN further decides whether the SGW is allowed to change the TEID and/or the IP address according to a state of the UE. The SGSN further maintains the state information of the UE, and if the SGSN determines that the UE in the idle state initiates the routing area update procedure, it indicates that the SGSN does not send the TEID and the IP address assigned by the SGW to the RNC. In this case, the SGW is allowed to modify the TEID and/or the IP address. If the SGSN determines that the UE in the connection state initiates the routing area update procedure, in this case, the SGW is not allowed to modify the TEID and/or the IP address.

3. The SGSN further decides whether the SGW is allowed to change the TEID and/or the IP address according to a state or a data storage condition of the UE. In the case that the UE in the connection state initiates the routing area update procedure, according to a stored user context, the SGSN determines that, for which PDN connections, the RNC stores the TEID and the IP address of the SGW, and for which PDN connections, the RNC does not store the TEID and the IP address assigned by the SGW. For the PDN connections that the RNC stores the TEID and the IP address assigned by the SGW, the SGW cannot change the TEID and/or the IP address. For the PDN connections that the RNC does not store the TEID and the IP address assigned by the SGW, the SGW is allowed to modify the TEID and/or the IP address. In the case that the UE in the idle state initiates the routing area update procedure, the SGW is allowed to change the TEID and/or the IP address.

The SGSN notifying the SGW may be specifically implemented in one of the methods defined in Embodiment 1.

Step 805: The SGW parses indication information in the modify bearer request message, and if the indication information allows modifying the TEID and/or the IP address, the SGW carries the changed TEID in a corresponding modify bearer response message, which may further include the IP address.

Further, if the indication information allows modifying the TEID and/or the IP address, the SGW currently needs to modify the TEID and/or the IP address due to such reasons as overload according to a policy of the SGW. The SGW carries the changed TEID in the answered modify bearer response message, which may further include the changed IP address.

The SGW may also determine whether the type of the current procedure allows changing the TEID and/or the IP address according to whether the modify bearer request message carries the TEID and/or the IP address assigned by the RNC. If the modify bearer request message carries the TEID and/or the IP address assigned by the RNC, the SGW regards that the type of the current procedure does not allow changing the TEID and/or the IP address assigned by the SGW. If the modify bearer request message does not carry the TEID and/or the IP address assigned by the RNC, the SGW regards that the type of the current procedure allows changing the TEID and/or the IP address assigned by the SGW.

When the SGW is allowed to change the assigned TEID and/or IP address, the SGW carries the changed TEID and/or IP address in the corresponding modify bearer response message. Moreover, when the SGW needs to change the TEID and/or the IP address due to such reasons as overload according to a policy of the SGW, the SGW may also carry the changed TEID and/or IP address in the corresponding modify bearer response message.

Step 806: A location update procedure is performed.

Step 807: The SGSN sends a routing area update accept message to the UE.

In the direct tunnel mode, after receiving the TEID and/or the IP address carried by the SGW in the modify bearer response message, the SGSN subsequently sends the TEID and/or the IP address to the RNC. For example, the SGSN sends the TEID and/or the IP address assigned by the SGW to the RNC through the PDP update procedure. In the indirect tunnel mode, the SGSN locally updates the TEID and/or the IP address assigned by the SGW. In the procedure that the SGW is allowed to change the TEID and/or the IP address, the RNC already releases the user plane tunnel between the SGW and the RNC, or a user plane tunnel connection is established between the SGSN and the SGW, and therefore, the SGW changing the TEID and/or the IP address does not influence the services.

In this embodiment, the SGSN obtains that this procedure is the routing area update procedure, so as to determine whether the SGW is allowed to change the TEID and/or the IP address; thereby, not only the loss of service data packets of a user or the service interruption may be reduced, but also the operation complexity in some cases may be simplified.

Embodiment 9

Figure 9:
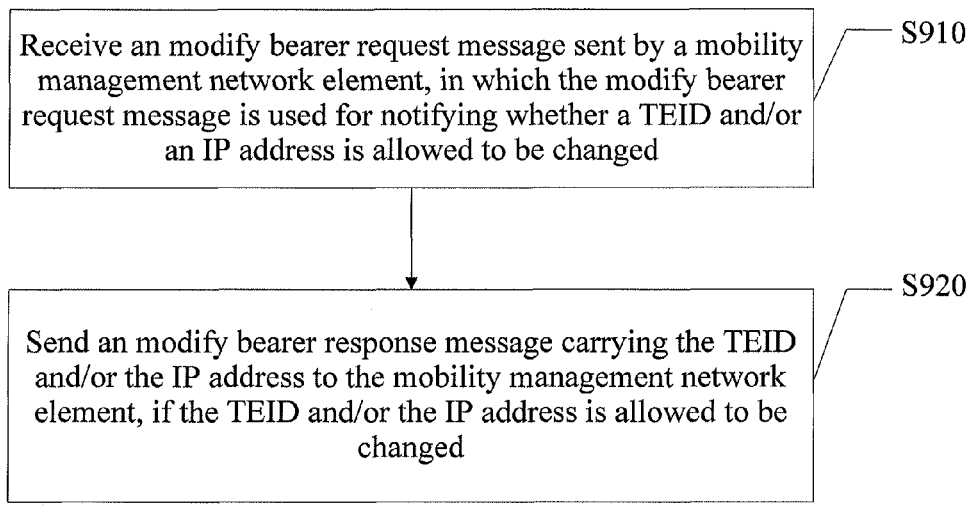
FIG. 9 is a flow chart of a method for controlling tunnel identifier allocation according to Embodiment 9 of the present invention.

This embodiment provides another method for controlling tunnel identifier allocation. As shown in FIG. 9, the method includes the following steps.

Step S910: Receive an modify bearer request message sent by a mobility management network element, in which the modify bearer request message is used for notifying whether a TEID and/or an IP address is allowed to be changed.

The mobility management network element notifying the SGW of whether the TEID and/or the IP address is allowed to be changed is implemented in the following manner.

The modify bearer request message carries indication information about whether the TEID and/or the IP address is allowed to be changed, in which the indication information indicates that the TEID and/or the IP address is allowed or not allowed to be modified, and the mobility management network element indicates whether the SGW is allowed to change the TEID and/or the IP address by carrying a newly added information element or an extended information element.

It is determined whether the modify bearer request message carries the TEID and the IP address assigned by the access network, and if the TEID and the IP address assigned by the access network are carried, it indicates that the TEID and/or the IP address is not allowed to be changed; while if the TEID and the IP address assigned by the access network are not carried, it indicates that the TEID and/or the IP address is allowed to be changed.

Step S920: If the TEID and/or the IP address is allowed to be changed, send an modify bearer response message carrying the TEID and/or the IP address to the mobility management network element.

In this step, the SGW parses indication information in the modify bearer request message, so as to obtain whether the type of the current procedure allows changing the TEID and/or the IP address.

The SGW may also obtain whether the type of the current procedure allows changing the TEID and/or the IP address according to whether the modify bearer request message carries the TEID and the IP address assigned by the access network. If the modify bearer request message carries the TEID and/or the IP address assigned by the access network, the SGW regards that the type of the current procedure does not allow changing the TEID and/or the IP address assigned by the SGW. If the modify bearer request message does not carry the TEID and/or the IP address assigned by the access network, the SGW regards that the type of the current procedure allows changing the TEID and/or the IP address assigned by the SGW.

When the SGW is allowed to change the assigned TEID and/or IP address, the SGW carries the changed TEID and/or IP address in the corresponding modify bearer response message. Moreover, when the SGW needs to change the TEID and/or the IP address due to such reasons as overload according to a policy of the SGW, the SGW may also carry the changed TEID and/or IP address in the corresponding modify bearer response message.

According to the embodiment of the present invention, the SGW decides whether the response message carries the changed TEID and/or IP address according to the information carried in the modify bearer request message about whether the TEID and/or the IP address is allowed to be changed, thereby avoiding the influence on user service data transmission caused by the SGW modifying the TEID and/or the IP address, and ensuring the effect of user experience.

Embodiment 10

Figure 10:
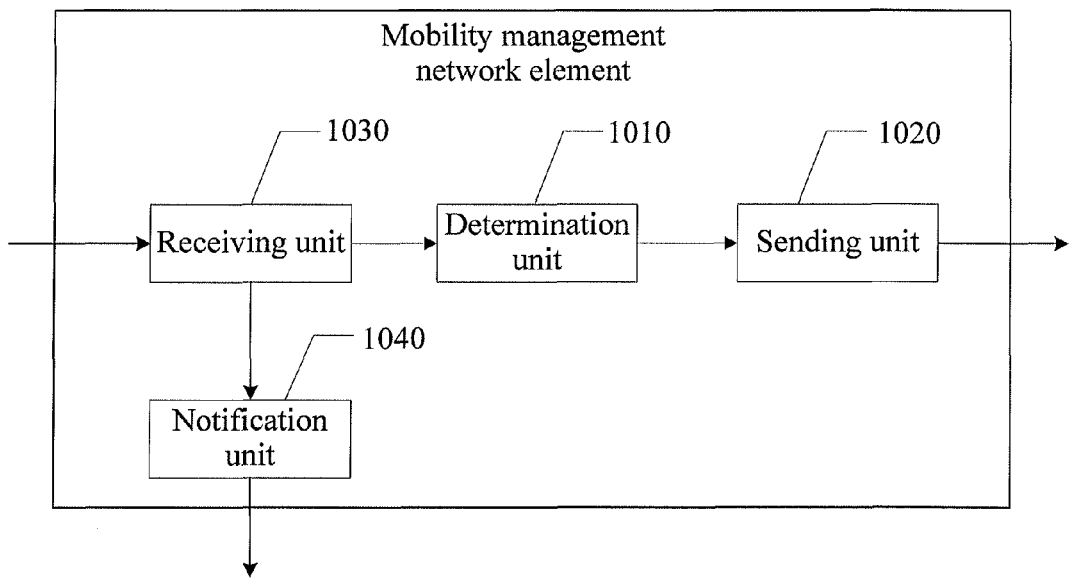
FIG. 10 is a schematic structural diagram of a mobility management network element according to Embodiment 10 of the present invention.

This embodiment provides a mobility management network element. As shown in FIG. 10, the mobility management network element includes a determination unit 1010 and a sending unit 1020.

The determination unit 1010 is configured to determine whether a type of a current procedure allows an SGW to change a TEID and/or an IP address.

The sending unit 1020 is configured to send an modify bearer request message to the SGW, in which the modify bearer request message is used for notifying the SGW of whether the SGW is allowed to change information of the TEID and/or the IP address.

The mobility management network element determines information about whether the SGW is allowed to change the TEID and/or the IP address according to the type of the current procedure. In different current procedures, the mobility management network element receives different front messages, determines the specific type of the current procedure according to the received front message, and further determines whether the SGW is allowed to change the TEID and/or the IP address. The front message refers to a message sent by a UE, an access network, or other mobility management network elements and received by the mobility management network element before sending the modify bearer request message to the SGW in the type of the current procedure. The type of the current procedure includes procedures such as attach, service request, handover/re-location, PDN connection establishment requested by the UE, PDP context activation, tracking area update, and routing area update. The mobility management network element includes an MME or an SGSN.

The mobility management network element further includes a receiving unit 1030 and a notification unit 1040.

The receiving unit 1030 is configured to receive the front message in the current procedure. The determination unit obtains the type of the current procedure according to the front message, and determines whether the SGW is allowed to change the TEID and/or the IP address according to the type of the current procedure.

Further, the receiving unit is further configured to receive an modify bearer request response message carrying the modified TEID and/or IP address returned by the SGW.

The notification unit 1040 is configured to notify an access network of the TEID and/or the IP address.

According to the embodiment of the present invention, for the type of the current procedure, the mobility management network element sends the modify bearer request message to notify the SGW of the information about whether the SGW is allowed to change the TEID and/or the IP address, thereby avoiding the influence on user service data transmission caused by the SGW modifying the TEID and/or the IP address, and ensuring the effect of user experience.

Embodiment 11

Figure 11:
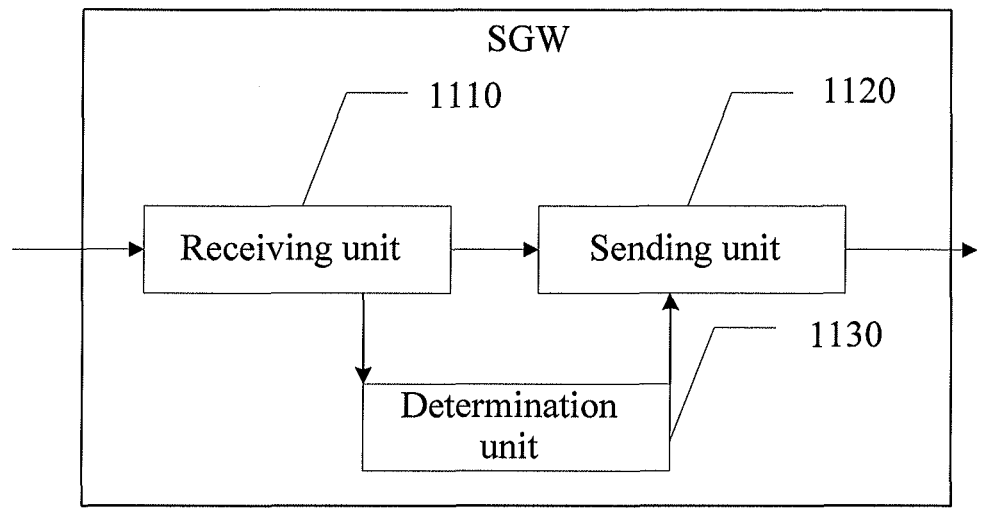
FIG. 11 is a schematic structural diagram of an SGW according to Embodiment 11 of the present invention.

This embodiment provides an SGW. As shown in FIG. 11, the SGW includes a receiving unit 1110 and a sending unit 1120.

The receiving unit 1110 is configured to receive an modify bearer request message sent by a mobility management network element, in which the modify bearer request message is used for notifying the SGW of whether a TEID and/or an IP address is allowed to be changed.

The mobility management network element notifying the SGW of whether the TEID and/or the IP address is allowed to be changed is implemented in the following manner. Through a newly added information element or an extended information element in the modify bearer request message, it is indicated whether the SGW is allowed to change the TEID and/or the IP address; or through whether the modify bearer request message carries the TEID and the IP address assigned by the access network, it is indicated whether the TEID and/or the IP address is allowed to be changed, and if the TEID and the IP address are carried, it indicates that the TEID and/or the IP address is not allowed to be changed; while if the TEID and the IP address are not carried, it indicates that the TEID and/or the IP address is allowed to be changed.

The sending unit 1120 is configured to send an modify bearer response message carrying the TEID and/or the IP address to the mobility management network element, if the TEID and/or the IP address is allowed to be changed. Alternatively, the sending unit 1120 is configured to send the modify bearer response message to the mobility management network element if the TEID and/or the IP address is not allowed to be changed, in which the modify bearer response message does not carry the TEID and/or the IP address.

The receiving unit 1110 receives indication information in the modify bearer request message, so as to obtain whether the type of the current procedure allows changing the TEID and/or the IP address.

Alternatively, it is determined whether the type of the current procedure allows changing the TEID and/or the IP address according to whether the TEID and the IP address assigned by the access network are carried. If the modify bearer request message carries the TEID and the IP address assigned by the access network, it is regarded that the type of the current procedure does not allow changing the TEID and/or the IP address assigned by the SGW. If the modify bearer request message does not carry the TEID and the IP address assigned by the access network, it is regarded that the type of the current procedure allows changing the TEID and/or the IP address assigned by the SGW.

When the SGW is allowed to change the assigned TEID and/or IP address, the SGW further includes a determination unit 1130, which is configured to further determine whether the current TEID and/or IP address needs to be modified according to an equipment overload condition and/or a board failure condition. If the current TEID and/or IP address needs to be modified, the sending unit sends the modify bearer response message carrying the modified TEID and/or IP address to the mobility management network element.

According to the embodiment of the present invention, the SGW reallocates the TEID and/or the IP address according to the information carried in the modify bearer request message for indicating whether the TEID and/or the IP address is allowed to be changed, thereby avoiding the influence on user service data transmission caused by the SGW modifying the TEID and/or the IP address, and ensuring the effect of user experience.

Embodiment 12

Figure 12:
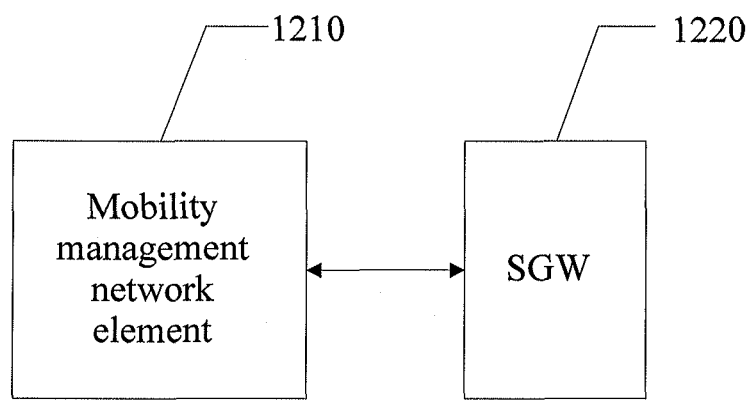
FIG. 12 is a schematic structural diagram of a system for controlling tunnel identifier allocation according to Embodiment 12 of the present invention.

This embodiment provides a system for controlling tunnel identifier allocation. As shown in FIG. 12, the system includes a mobility management network element 1210 and an SGW 1220.

The mobility management network element 1210 is configured to determine whether a type of a current procedure allows an SGW to change a TEID and/or an IP address; and send an modify bearer request message to the SGW, in which the modify bearer request message is used for notifying the SGW of whether the SGW is allowed to change information of the TEID and/or the IP address.

The SGW 1220 is configured to receive the modify bearer request message sent by the mobility management network element, in which the modify bearer request message is used for notifying whether the TEID and/or the IP address is allowed to be changed; and send an modify bearer response message carrying the TEID and/or the IP address to the mobility management network element, if the TEID and/or the IP address is allowed to be changed.

The mobility management network element determines information about whether the SGW is allowed to change the TEID and/or the IP address according to the type of the current procedure. In different current procedures, the mobility management network element receives different front messages, determines the specific type of the current procedure according to the received front message, and further determines whether the SGW is allowed to change the TEID and/or the IP address. The front message refers to a message sent by a UE, an access network, or other mobility management network elements and received by the mobility management network element before sending the modify bearer request message to the SGW in the type of the current procedure. The type of the current procedure includes procedures such as attach, service request, handover, re-location, PDN connection establishment requested by the UE, PDP context activation, tracking area update, and routing area update. The mobility management network element includes an MME or an SGSN. For example, the UE initiates an attach procedure, and after receiving an attach request sent by an access network, the mobility management network element obtains that the type of the current procedure is the attach procedure; while for the attach procedure, the SGW is not allowed to change the TEID and/or the IP address. In addition to the attach procedure, for a procedure such as service request, handover, re-location, PDN connection, or PDP context activation, the SGW is also not allowed to change the TEID and/or the IP address. When the type of the current procedure is routing area update or tracking area update, the SGW is allowed to change the TEID and/or the IP address. Further, when the type of the current procedure is the service request procedure or the routing area update procedure, the SGSN firstly determines a state of the UE initiating the procedure. When the UE is in an idle state, the SGW is allowed to change the TEID and/or the IP address; while when the UE is in a connection state, the SGW is not allowed to change the TEID and/or the IP address. When the type of the current procedure is the tracking area update request, the MME firstly determines the state of the UE initiating the procedure. When the UE is in the idle state, the SGW is allowed to change the TEID and/or the IP address; while when the UE is in the connection state, the SGW is not allowed to change the TEID and/or the IP address. The connection state refers to a signaling connection exists between a user and a network side. For example, an RRC connection and an S1_MME interface connection are provided between the UE and the MME, an RRC connection and an Iu interface connection are provided between the UE and the SGSN, and the network side becomes aware of a accurate location of the UE. The idle state refers to that the signaling connection between the user and the network side is released, and the network side perceives an approximate location of the UE. When the type of the current procedure is the service request procedure, the handover/re-location procedure, or the routing area update procedure, the SGSN firstly determines whether the RNC stores the TEID and/or the IP address assigned by the SGW for the PDN connection, and if the RNC does not store the TEID and/or the IP address, the SGW is allowed to change the TEID and/or the IP address; while if the RNC stores the TEID and/or the IP address, the SGW is not allowed to change the TEID and/or the IP address. When the type of the current procedure is the PDP context activation procedure, the mobility management network element firstly determines whether it is the direct tunnel mode, and if it is the direct tunnel mode, the SGW is not allowed to change the TEID and/or the IP address; while if it is not the direct tunnel mode, the SGW is allowed to change the TEID and/or the IP address.

The mobility management network element notifying the SGW of the modify bearer request message about whether the SGW is allowed to change the TEID and/or the IP address may be specifically implemented in one of the following manners.

1. It may be implemented through a newly added information element or an extended information element. The following manners are included.

In Manner 1, the modify bearer request message carries an indication, which indicates that the SGW cannot change the TEID and/or the IP address, and when the modify bearer request message does not carry the indication, the SGW is allowed to modify the TEID and/or the IP address.

In Manner 2, the modify bearer request message carries an indication, which indicates that the SGW may change the TEID and/or the IP address, and when the modify bearer request message does not carry the indication, the SGW is not allowed to change the TEID and/or the IP address.

In Manner 3, the modify bearer request message carries two different indications, which respectively indicate that the SGW is allowed or not allowed to modify the TEID and/or the IP address.

2. It may also be implemented according to an existing procedure. The modify bearer request message carrying or not carrying the TEID and/or the IP address assigned by the access network is sent to the SGW, in which if the TEID and/or the IP address are carried, it indicates that the SGW is not allowed to modify the TEID and/or the IP address; while if the TEID and/or the IP address are not carried, it indicates that the SGW is allowed to modify the TEID and/or the IP address.

According to the embodiment of the present invention, for the type of the current procedure, the mobility management network element sends the modify bearer request message to the SGW for notifying the SGW of the information about whether the TEID and/or the IP address is allowed to be changed, thereby avoiding the influence on user service data transmission caused by the SGW modifying the TEID and/or the IP address, and ensuring the effect of user experience.

The objectives, technical solutions, and beneficial effects of the present invention have been illustrated in further detail through the above specific embodiments. It should be understood that the above descriptions are merely specific embodiments of the present invention, but not intended to limit the scope of the present invention. Any modification, equivalent replacements, or improvements made without departing from the spirit and principle of the present invention shall fall within the protection scope of the present invention.

What is claimed is:

1. A method for controlling tunnel identifier allocation, comprising:
   receiving, by a mobility management entity (MME), a tracking area update (TAU) request from a terminal device, wherein the terminal device is initiating a TAU procedure and is in an idle state;
   determining, by the MME, that a serving gateway (SGW), which assigned a first tunnel endpoint identifier (TEID) for a tunnel between the SGW and a base station, is allowed to change the first TEID without changing the SGW, wherein if the terminal device is not in an idle state and a current procedure of the terminal device is not a TAU procedure, the SGW is not allowed to change the first TEID;
   sending, by the MME, a modify bearer request message to the SGW, wherein the modify bearer request message includes an indication indicating that the SGW is allowed to change the first TEID without changing the SGW in the current TAU procedure;
   receiving, by the MME, a modify bearer response message from the SGW, wherein the modify bearer response message includes a new TEID assigned by the SGW if the SGW needs to change the first TEID; and
   sending, by the MME, a TAU accept message to the terminal device.

2. The method according to claim 1, further comprising: sending, by the MME, the new TEID to the base station.

3. A mobility management entity (MME), comprising:
   a receiver, configured to receive a tracking area update (TAU) request from a terminal device, wherein the terminal device is initiating a TAU procedure and is in an idle state;
   a processor, configured to:
      determine that a serving gateway (SGW), which assigned a first tunnel endpoint identifier (TEID) for a tunnel between the SGW and a base station, is allowed to change the first TEID without changing the SGW, wherein if the terminal device is not in an idle state and a current procedure of the terminal device is not a TAU procedure, the SGW is not allowed to change the first TEID; and
   a transmitter, configured to send a modify bearer request message to the SGW, wherein the modify bearer request message includes an indication indicating that the SGW is allowed to change the first TEID without changing the SGW in the current TAU procedure;
   wherein the receiver is further configured to receive a modify bearer response message from the SGW, and the modify bearer response message includes a new TEID assigned by the SGW if the SGW needs to change the first TEID; and
   wherein the transmitter is further configured to send a TAU accept message to the terminal device.

4. The MME according to claim 3, wherein the transmitter is further configured to send the new TEID to the base station.

5. A system, comprising a mobility management entity (MME) and a serving gateway (SGW), wherein
   the MME is configured to:
      receive a tracking area update (TAU) request from a terminal device, wherein the terminal device is initiating a TAU procedure and is in an idle state;
      determine that the SGW, which assigned a first tunnel endpoint identifier (TEID) for a tunnel between the SGW and a base station, is allowed to change the first TEID without changing the SGW, wherein if the terminal device is not in an idle state and a current procedure of the terminal device is not a TAU procedure, the SGW is not allowed to change the first TEID;
      send a modify bearer request message to the SGW, wherein the modify bearer request message includes an indication indicating that the SGW is allowed to change the first TEID without changing the SGW in the current TAU procedure;
      receive a modify bearer response message from the SGW; and
      send a TAU accept message to the terminal device; and
   the SGW is configured to change the first TEID if the first TEID needs to be changed, wherein the modify bearer response message includes a new TEID assigned by the SGW.

6. The system according to claim 5, wherein the MME is further configured to send the new TEID to the base station.

* * * * *